United States Patent [19]

Furuta et al.

[11] Patent Number: 5,210,612

[45] Date of Patent: May 11, 1993

[54] CIRCUIT FOR READING A PLURALITY OF CCD SENSORS DURING RESPECTIVE NON-OVERLAPPING OUTPUT PERIODS

[75] Inventors: Toshiyuki Furuta; Yasuhiko Yokomori, both of Yokohama; Masato Ohta, Kawasaki; Hideo Suda, Yokohama; Naoki Ozawa; Shogo Kida, both of Kawasaki, all of Japan

[73] Assignee: Suzuki Motor Corporation, Shizuoka, Japan

[21] Appl. No.: 705,637

[22] Filed: May 24, 1991

[30] Foreign Application Priority Data

May 25, 1990 [JP] Japan ................................. 2-136021

[51] Int. Cl.⁵ .......................................... H04N 5/335
[52] U.S. Cl. ............................ 358/213.11; 358/213.26
[58] Field of Search .................. 358/213.11, 213.15, 358/213.16, 213.17, 213.18, 213.13, 213.23, 213.26, 213.29; 250/208.1; 382/67

[56] References Cited

U.S. PATENT DOCUMENTS

| | | | |
|---|---|---|---|
| 4,146,786 | 3/1979 | Agulnek | 250/235 |
| 4,465,939 | 8/1984 | Tamura | 250/208.1 |
| 4,675,745 | 6/1987 | Suzuki | 358/285 |
| 4,754,338 | 6/1988 | Hideshima | 358/293 |
| 4,862,286 | 8/1989 | Suda et al. | 358/494 |

FOREIGN PATENT DOCUMENTS 57-24707  5/1982  Japan.
60-163564 8/1985 Japan.

Primary Examiner—Michael T. Razavi
Assistant Examiner—Tuan V. Ho
Attorney, Agent, or Firm—Flynn, Thiel, Boutell & Tanis

[57] ABSTRACT

A CCD driving circuit for reading and outputting data from a plurality of CCD sensors, each CCD sensor being actuable to convert an image into data by first optically sensing the image during a first time period and thereafter converting the optically-sensed image into data during a second time period, including a driving arrangement for actuating the CCD sensors such that the first time periods associated therewith are staggered so that the second time periods associated therewith do not overlap each other. A multiplexing arrangement is provided for multiplexing and outputting the data read from each of the CCD sensors.

5 Claims, 4 Drawing Sheets

FIG.1 EMBODIMENT

FLOWCHART

(TIMING CHART)

(ALLOTMENT OF CCD NUMBERS)

| COUNT VALUE | 0~5999 | 6000~11999 | 12000~24999 |
|---|---|---|---|
| A | 0 | 1 | 0 |
| B | 0 | 0 | 1 |
| EFFECTIVE CCD NUMBERS | 1 | 2 | 3 |

(READING TIME)

(THIS DATA IS INVALID BECAUSE ST ENTERS DURING THE READING OPERATION)

[THE TIME FROM ST TO END IS THE LONGEST READING TIME]

(CONVENTIONAL METHOD)

- THE TIME FROM ST TO END IS THE SHORTEST READING TIME
- X INDICATES THE FACT THAT DATA ARE DISCARDED WHILE REMAINING CCD ARE BEING READ

CIRCUIT FOR READING A PLURALITY OF CCD SENSORS DURING RESPECTIVE NON-OVERLAPPING OUTPUT PERIODS

FIELD OF THE INVENTION

This invention relates to a circuit for driving a CCD, and particularly to a CCD driving circuit capable of shortening operation time for a blood test apparatus, etc.

BACKGROUND OF THE INVENTION

Extensive research and development have been made in various fields of technology in order to automate the judgment of a particle coagulation pattern in a clinical test of blood, etc.

For example, there is already proposed one system in which an automatic judgment of a coagulation pattern is performed in an optical way in a blood test apparatus. Diffusion light from an LED (light emitting diode) is irradiated onto a transparent microplate which is provided with a plurality of reaction vessels for coagulating blood therein, and the light transmitted through the microplate passes through a lens system and is detected by a plurality of CCD line sensors disposed adjacent a lower surface of the microplate. This microplate is mechanically movable, thereby enabling the system to read, one after another, images showing the states of coagulation of blood dropped into the plurality of reaction vessels disposed on the microplate in different testing bodies. The images are converted into the form of electronic signals by the CCD line sensors.

In such blood testing apparatus as mentioned, owing to limitation of the length of each CCD sensor with respect to the size of the microplate, images of coagulation patterns are read using a plurality of CCD sensors. As a method for driving the CCD sensors used in such case, there was contemplated a parallel driving method, in which a plurality of CCD sensors (a system employing three CCD sensors is reviewed here) are simultaneously driven.

FIG. 6 is a timing chart for explaining the conventional CCD driving method. In this driving method, three CCD sensors (CCD1, CCD2 and CCD3) are simultaneously driven in parallel, and the output of each of the three CCD sensors is gradually read. In FIG. 6, the time from ST to END indicates the shortest reading time, and the mark X indicates the fact that data are discarded while output of the remaining CCD sensors is being read.

In general, the light accumulation time which the CCD requires for obtaining an effective CCD output waveform (gain) is very long compared with the time (effective output time) required for the CCD to generate an output corresponding to the number of elements which the CCD has. That is, the time required for optically sensing the image is much longer than the subsequent time required for converting the optically sensed image into an output electronic signal (i.e., output data).

The total time required for reading the output of the three CCDs in the parallel driving method of FIG. 6 is [light accumulation time ×2+Effective output time] at minimum, even if it is presumed that the timing for starting the reading can be suitably selected and the sequential order for the reading is not fixed. Thus, it inevitably becomes a very inefficient method.

The present invention aims at solving such problem inherent in the prior art.

The object of the present invention is to provide, in a CCD driving method using a plurality of CCD sensors, the capability of shortening the time required for reading the outputs from the plurality of CCD sensors, thereby enhancing efficient processing of CCD output signals.

The present invention is directed to a CCD driving circuit for reading and outputting data from a plurality of CCD sensors, and includes driving means which drives the CCD sensors such that the driving times of said CCD sensors are staggered so that the effective output times of said CCD sensors will not overlap each other, and data read from each of said CCD sensors are multiplexed by multiplexing means and then output. Accordingly, the time required for reading the outputs from a plurality of CCD sensors can be shortened compared with the conventional parallel driving method.

DETAILED DESCRIPTION

Figure 1:
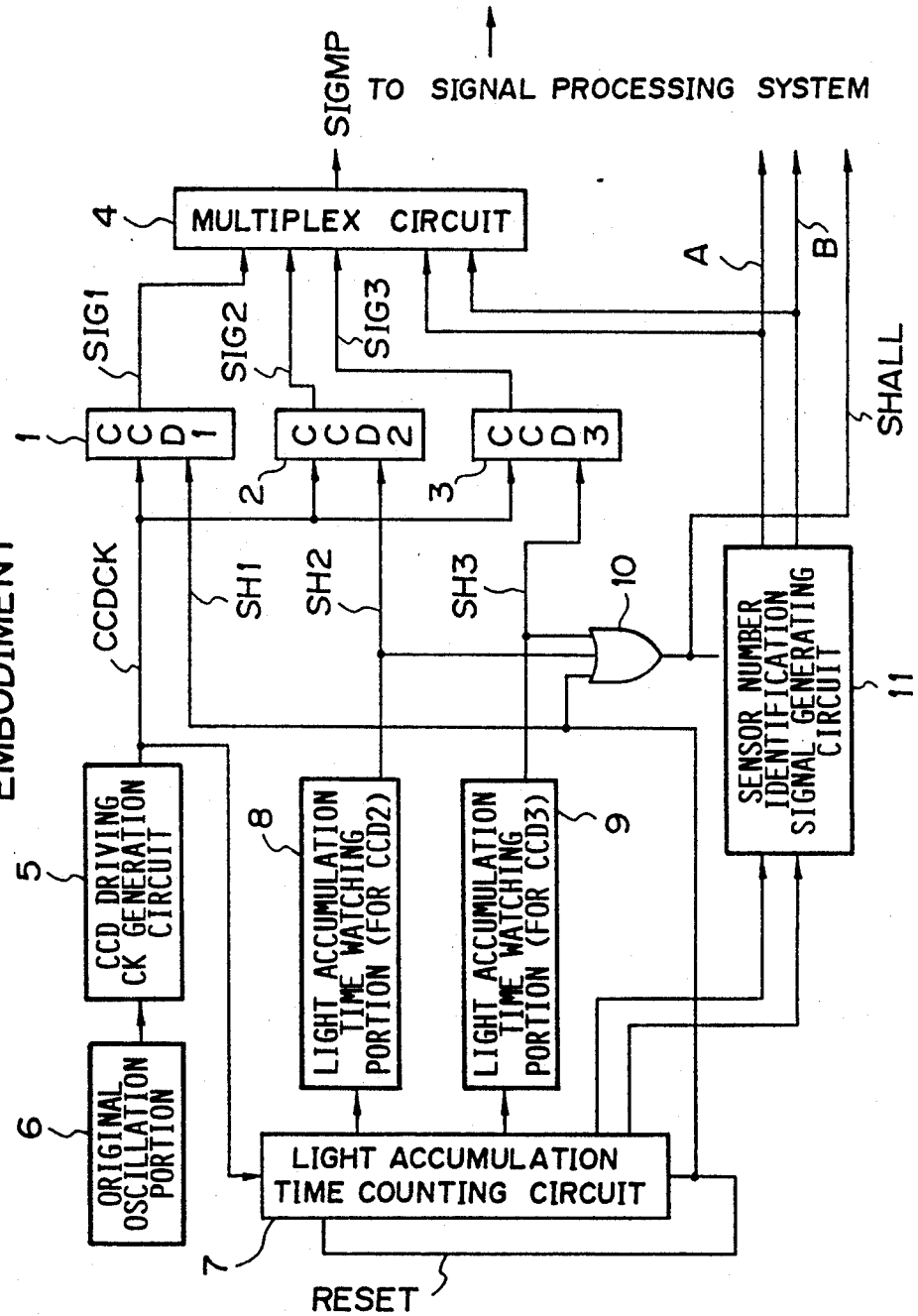
FIG. 1 is a view showing one embodiment of the present invention.

FIG. 1 is an illustration showing one embodiment of the present invention. In FIG. 1, the numerals 1, 2 and 3 represent CCD image sensors, respectively. The numeral 4 denotes a conventional multiplex circuit for multiplexing the output of the CCD sensors 1 through 3 with number identification signals of various sensors, 5 is a CK generation circuit for generating clock signal CCDCK for driving the CCD sensors, 6 is an original oscillation portion for feeding an original oscillation signal to CK generation circuit 5 and acting as an origin of clock signal CCDCK, 7 is a light accumulation time counting circuit comprising a counter for counting a light accumulation time in each CCD sensor, 8 and 9 are light accumulation time watching portions for watching a light accumulation time for CCD sensors 2 and 3, 10 is an OR circuit, and 11 is a sensor number identification signal generation circuit for generating signals for identifying the number of each CCD sensor.

Figure 2:
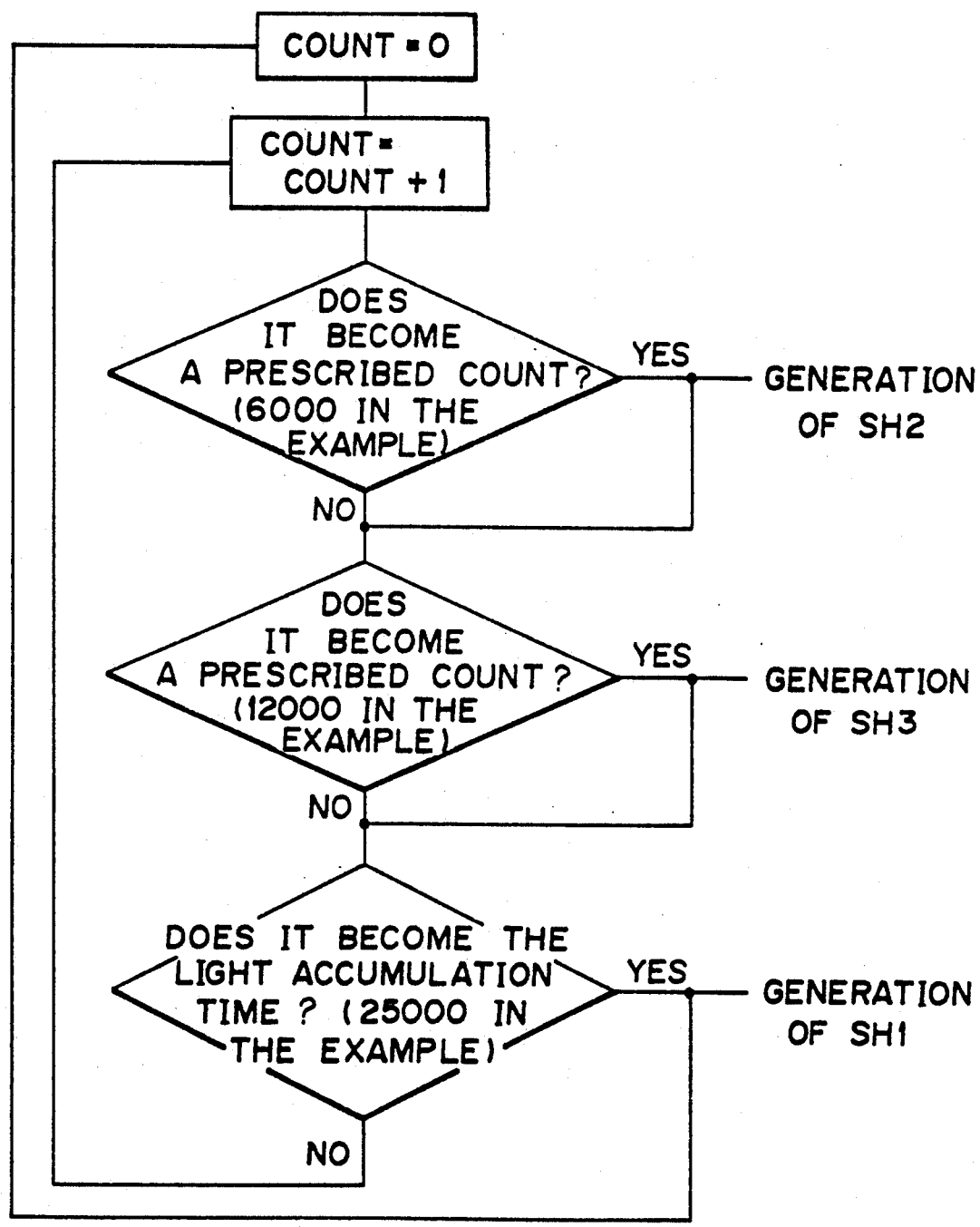
FIG. 2 is a flowchart showing the flow of operation in the embodiment shown in FIG. 1.

FIG. 2 is a flowchart showing the flow of operation in the embodiment shown in FIG. 1.

Figures 3, 4:
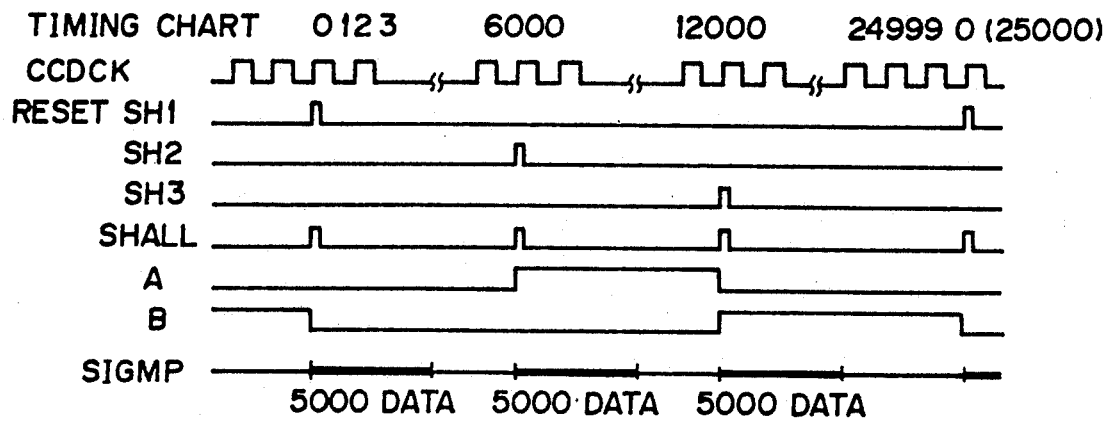
FIG. 3 is a timing chart showing signals of various parts in the embodiment shown in FIG. 1.
FIG. 4 is a diagram showing allotment of effective CCD numbers.

Further, FIG. 3 is a timing chart showing signals for each portion in the embodiment shown in FIG. 1.

Operation of the CCD driving circuit of the present invention will now be described with reference to these figures.

Figure 6:
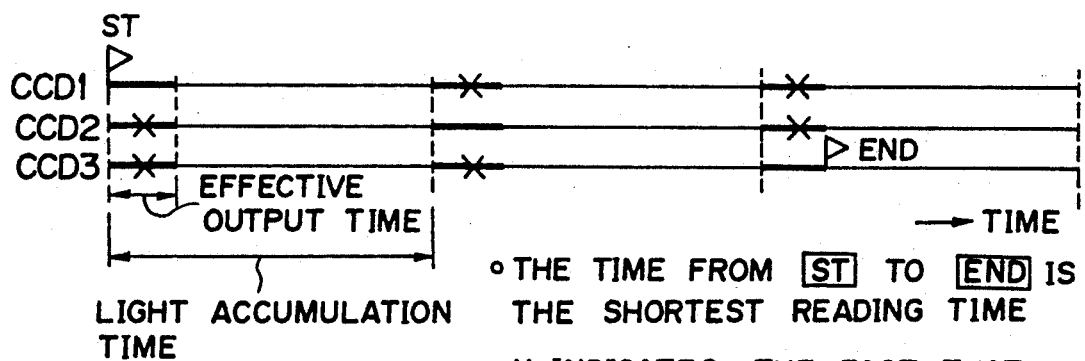
FIG. 6 is a timing chart for explaining the conventional CCD driving method.

The CCD driving circuit of the present invention includes the light accumulation time counting circuit 7 and light accumulation time watching portions 8 and 9 for driving the CCD sensors 1, 2 and 3 such that the respective driving times for the CCD sensors are staggered so that the effective output times of the CCD sensors 1, 2 and 3 will not overlap each other, in contrast to prior art FIG. 6. The multiplex circuit 4 multiplexes data as read from each CCD sensors 1, 2 and 3 and outputs the data.

The amount of data which is to be generated by the CCD sensors 1, 2 and 3 is predetermined. In this embodiment, 5,000 units of data are assumed to be generated by each CCD sensor 1, 2 and 3.

Each CCD sensor 1, 2 and 3 is normally fed clock signals CCDCK from the CCD driving CK generation circuit 5, and generates an output comprising the above-mentioned number of data units in accordance with the clock signals CCDCK when read starting signals SH1, SH2 and SH3 are fed thereto, respectively.

As a consequence, the original oscillation portion 6 generates an original oscillation signal of a constant frequency, and the CCD driving CK generation circuit 5 generates a clock signal based on this original oscillation signal and feeds the same to the respective CCD sensors 1, 2 and 3.

The light accumulation time counting circuit 7 comprising a counter counts the time required for each CCD sensor 1, 2 and 3 to accumulate light. The light accumulation time (i.e. optical sensing time) is preset to 25,000 counts of the clock signal CCDCK in this embodiment. The light accumulation time counting circuit 7 is reset every 25,000 counts in order to repeat a new counting and generates a read starting signal SH1 every time it is reset.

The light accumulation time watching portions 8 and 9 watch the count value in the light accumulation time counting circuit 7. The light accumulation time watching portion 8 generates a read starting signal SH2 when the count value becomes 6,000 and the light accumulation time watching portion 9 generates a read starting signal SH3 when the count value becomes 12,000. This operation is illustrated by the FIG. 2 flowchart and the FIG. 3 timing diagram.

Each CCD sensor 1, 2 and 3 starts the optical sensing process when the corresponding read starting signals SH1, SH2 and SH3 are given, respectively, and eventually outputs 5,000 data units, respectively, in accordance with the clock signal CCDCK. The output data of the CCD sensors 1, 2 and 3 is multiplexed via the multiplex circuit 4 to generate an output signal SIGMP.

On the other hand, the OR circuit 10 takes a logical sum of the respective read starting signals SH1, SH2 and SH3 and generates a signal SHALL, which indicates the start of data from each CCD sensor in the output signal SIGMP, as explained below.

The sensor number identification signal generation circuit 11 generates two logic signals A and B in response to the signal SHALL from the OR circuit 10. The signals A and B, as shown in FIG. 4, correspond to the ranges of count values allotted to the respective CCD sensors 1, 2 and 3 and indicate effective CCD numbers 1 through 3 showing which CCD sensor is currently generating an effective output which can be read.

The signals A and B are input, together with signals from the respective CCD sensors, to the multiplex circuit 4 (note: A and B are only used to control the multiplexing of SIG1 through SIG3 and they themselves are not multiplexed), and the signals A and B control the multiplexing of the signals from the respective CCD sensors to obtain an output signal SIGMP from the multiplex circuit 4. The signals A and B are also transmitted to a signal processing system not illustrated.

Figure 5:
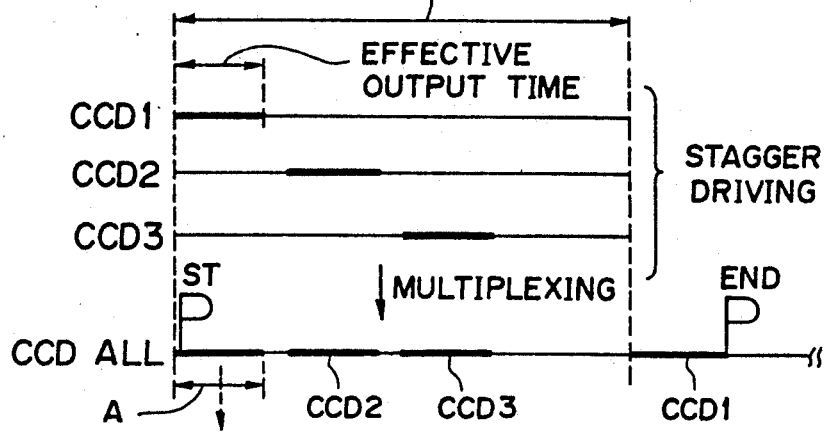
FIG. 5 is a diagram showing the reading time associated with the present invention.

The signal processing system starts the reading of the multiplexed signal SIGMP coming from each CCD sensor by using each pulse of the signal SHALL as a trigger and at the same time, a sensor number corresponding to the proper signal SIG1, SIG2 or SIG3 is determined by the signals A and B. FIG. 5 shows the reading operation according to the method of the present invention. In this case, the time interval from ST to END is the longest reading time, the data represented by A being invalidated because ST enters during the reading operation associated with CCD1.

From FIG. 5, it is apparent that in the case of the present invention, where the light accumulation time interval is an effective output time interval multiplied by the number of CCD used (three pieces in this embodiment) or more, an efficient operation can be performed by multiplexing the signals in such a way as to gradually stagger the timing for driving the CCDs, and the time for reading data from the three CCD sensors becomes [light accumulation time interval+effective output time], at the longest.

As described in the foregoing, according to the present invention, in a CCD driving method in a blood testing apparatus, etc. using a plurality of CCD sensors, the time for reading the output of a plurality of CCD sensors can be shortened. Therefore, since it becomes possible to effectively process the CCD output signals, the performance of a blood testing apparatus, etc. using such CCD is enhanced.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A CCD driving circuit comprising circuit means for reading and outputting data from a plurality of CCD sensors which are each actuable to convert an image into said data by first optically sensing the image during a first time period and thereafter generating said data based on the optically-sensed image during a second time period, said circuit means including driving means for actuating said plurality of CCD sensors such that the first time periods of said CCD sensors are staggered so that the second time periods of said CCD sensors will not overlap each other, and multiplexing means for multiplexing and outputting said data read from each of said CCD sensors, wherein said driving means includes a counting circuit for periodically generating a first read starting signal which is applied to a first of said CCD sensors, and a plurality of time watching circuits which are each responsive to said counting circuit and which each supply to a respective said CCD sensor other than said first CCD sensor a respective further read starting signal at a point in time delayed by a respective unique time interval from each said first read starting signal.

2. A CCD driving circuit according to claim 1, wherein said driving means includes means for causing the first time periods associated with said CCD sensors to overlap one another.

3. A CCD driving circuit according to claim 1, including an OR gate having a plurality of inputs each coupled to a respective one of said read starting signals and having an output which is a data starting signal.

4. A CCD driving circuit according to claim 3, wherein said multiplexing means includes a multiplexer having a plurality of data inputs each coupled to a data output of a respective one of said CCD sensors, having a plurality of control inputs, and having a data output, and wherein said driving means includes sensor number signal generating means responsive to said counting circuit and said output of said OR gate for generating a plurality of control signals which are each applied to a respective one of said control inputs of said multiplexer.

5. A CCD driving circuit according to claim 4, wherein said counting circuit generates successive said first read starting signals at points in time which are spaced by said first time period.

* * * * *